UNITED STATES PATENT OFFICE.

JAMES M. DILLON, OF WOOD LAWN, ILLINOIS.

IMPROVEMENT IN PROCESSES FOR PRESERVING MEATS.

Specification forming part of Letters Patent No. 217,779, dated July 22, 1879; application filed May 29, 1879.

*To all whom it may concern:*

Be it known that I, JAMES M. DILLON, of Wood Lawn, Jefferson county, Illinois, have invented a new and useful Method of Curing Meats and other Articles; and I hereby declare the following to be a full, clear, and exact description thereof.

The object of my invention is to cure meats, fish, &c., so that they will have all the properties and flavor of smoked goods, and yet avoid the necessity of hanging in a smoke-house, as is customary.

My invention consists in strongly impregnating ordinary dry salt (NaCl) with the smoke of smoldering wood, and then using this salt for packing the meat when it is butchered, the salt being thoroughly charged with the creosote and other antiseptic qualities of the smoke, which are transferred to the meat or other article, and absorbed when the salt is absorbed.

To enable others skilled in the art to make and use my invention, I will proceed to describe the exact manner in which I have carried it out.

Any convenient means may be used for charging the salt with the smoke; but I prefer to take a retort very similar to an ordinary retort used for making coal-gas, charge it with wood, and apply heat to it. The wood will soon commence to smolder, and the smoke generated is conducted by a pipe to a receptacle containing the dry salt. The smoke condenses on the surface of the salt crystals, and is then absorbed. The meat is then cured by applying the smoked salt thus prepared in the methods known as "dry-salting," and the meat is cured by the salt and antiseptic qualities of the smoke, and has the flavor of meat hung and smoked.

The many advantages in my improved mode of treatment will be readily apparent to pork and beef packers. Time is saved, danger from fire is avoided, insurance rates reduced, and meat thoroughly well cured.

I am aware that it is not new to apply brine impregnated with smoke for the preservation of meat, and I do not claim such as my invention.

Having thus described my invention, I claim as new and desire to secure by Letters Patent—

1. As a new article of manufacture, salt impregnated with smoke as a preserving agent, substantially as set forth.

2. The improved process herein described for preserving and curing meat, the same consisting in preserving the meat by dry-salting by means of a preparation of salt impregnated with smoke, substantially as herein described.

JAMES M. DILLON.

Witnesses:
WILLIAM JAMES DILLON,
J. P. FARMER.